United States Patent
Melcher et al.

(10) Patent No.: US 8,731,414 B2
(45) Date of Patent: May 20, 2014

(54) OPTICAL RECEIVER FOR RECEIVING LIGHT AND OPTOELECTRONIC MEASURING ARRANGEMENT

(75) Inventors: Rolf Melcher, Karlsruhe (DE); Uwe Hill, Remchingen (DE)

(73) Assignee: Mechaless Systems GmbH, Bruchsal (DE)

(*) Notice: Subject to any disclaimer, the term of this patent is extended or adjusted under 35 U.S.C. 154(b) by 178 days.

(21) Appl. No.: 13/363,774

(22) Filed: Feb. 1, 2012

(65) Prior Publication Data

US 2013/0028593 A1 Jan. 31, 2013

Related U.S. Application Data

(63) Continuation of application No. PCT/EP2010/004145, filed on Jul. 7, 2010.

(30) Foreign Application Priority Data

Aug. 19, 2009 (EP) .................................... 09168185

(51) Int. Cl.
*H04B 10/06* (2006.01)

(52) U.S. Cl.
USPC .......... 398/208; 398/210; 398/212; 398/202; 398/171; 250/200; 250/216

(58) Field of Classification Search
USPC ............................................. 250/216–227.32
See application file for complete search history.

(56) References Cited

U.S. PATENT DOCUMENTS

| | | | |
|---|---|---|---|
| 4,249,076 A | 2/1981 | Bergstrom et al. | |
| 5,223,707 A * | 6/1993 | Bjork | 250/227.21 |

(Continued)

FOREIGN PATENT DOCUMENTS

| | | |
|---|---|---|
| DE | 028 49 186 A1 | 6/1979 |
| DE | 044 31 117 C2 | 3/1996 |

(Continued)

OTHER PUBLICATIONS

International Patent Application PCT/EP2010/004145 International Preliminary Report on Patentability mailed Feb. 21, 2012.

(Continued)

*Primary Examiner* — Li Liu
(74) *Attorney, Agent, or Firm* — Woodard, Emhardt, Moriarty, McNett & Henry LLP

(57) ABSTRACT

The present invention relates to an optical receiver (1) for receiving alternating-light data signals and for storing electrical energy obtained from extraneous light, having a photodiode (2) for receiving light, which comprises extraneous light and an alternating-light data signal component with a higher frequency in comparison to the extraneous light, and for converting the light into a photocurrent ($I_P$) which comprises a data signal current ($I_N$) and an extraneous light current ($I_F$) said receiver additionally comprises a coupling unit (3) for coupling in and separating the data signal current generated by the optical alternating-light data signal component from the extraneous light current generated by the extraneous light, an amplifying unit (4) for amplifying the data signal current and an energy storage unit (5) which is charged by the extraneous light current ($I_F$) and which includes a circuit for increasing voltage, wherein the energy charged in the energy storage unit (5) is used for at least partially supplying the energy for the optical receiver (1) and/or for at least partially supplying the energy for a measurement arrangement (16) comprising the optical receiver (1).

22 Claims, 10 Drawing Sheets

(56) References Cited

U.S. PATENT DOCUMENTS

| | | |
|---|---|---|
| 5,666,037 A | 9/1997 | Reime |
| 5,739,938 A * | 4/1998 | Goutzoulis et al. ............ 398/197 |
| 5,789,738 A | 8/1998 | Reime |
| 6,359,517 B1 * | 3/2002 | Colaco ............................ 330/308 |
| 6,643,472 B1 * | 11/2003 | Sakamoto et al. ............ 398/202 |
| 6,677,806 B2 | 1/2004 | Bloch |
| 7,359,647 B1 * | 4/2008 | Faria et al. .................... 398/171 |
| 7,456,815 B2 | 11/2008 | Reime |
| 2002/0044746 A1 * | 4/2002 | Kronlund et al. ................. 385/53 |
| 2004/0086282 A1 * | 5/2004 | Graves et al. ................. 398/202 |
| 2005/0089334 A1 * | 4/2005 | Regev et al. ................... 398/139 |
| 2007/0297717 A1 | 12/2007 | Watanabe |
| 2008/0235418 A1 * | 9/2008 | Werthen et al. ............... 710/106 |

FOREIGN PATENT DOCUMENTS

| | | |
|---|---|---|
| DE | 199 53 882 A1 | 5/2001 |
| DE | 101 33 823 A1 | 2/2003 |
| DE | 103 00 223 B3 | 6/2004 |
| DE | 10 2006 036561 A1 | 3/2008 |
| EP | 0 367 333 A1 | 5/1990 |
| EP | 0 706 648 B1 | 4/1996 |
| EP | 0 924 880 A1 | 6/1999 |
| EP | 1 956 493 A1 | 8/2008 |

OTHER PUBLICATIONS

International Patent Application PCT/EP2010/004145 International Search Report mailed Nov. 2, 2010.

* cited by examiner

OPTICAL RECEIVER FOR RECEIVING LIGHT AND OPTOELECTRONIC MEASURING ARRANGEMENT

CROSS-REFERENCE TO RELATED APPLICATION

This application is a continuation of International Application No. PCT/EP2010/004145, filed Jul. 7, 2010, which claims the benefit of European Application No. 09168185.8, filed Aug. 19, 2009, the entire disclosures of which are hereby incorporated by reference.

BACKGROUND

The present invention relates to an optical receiver for receiving alternating-light data signals and for storing electrical energy obtained from extraneous light, having a photodiode for receiving light and for converting the light into a photocurrent. The received light comprises extraneous light and an alternating-light data signal component having a higher frequency in comparison to the extraneous light, which is generated by a light source emitting a data signal. The photocurrent resulting from the conversion of the light comprises a data signal current and an extraneous light current.

The invention also relates to an optoelectronic measurement arrangement having an extraneous light compensation comprising a data signal light source and a compensation light source, an optical receiver with a photodiode and an amplifying unit and an extraneous light compensation circuit. The invention further relates to a method for storing electrical energy obtained from extraneous light, and for receiving optical alternating-light data signals.

Optical sensors receive light, which in addition to the actively emitted light of a data signal light source also comprises the extraneous light prevailing in the environment, in particular the daylight. The received ambient light is in general substantially more intense than the light component radiated by the data signal light sources (useful signal light source).

Optical receivers of this kind are used for example as parts of active optical sensors, which in addition to the receiver also comprise a light source and emit light. The light emitted by the optical sensors is reflected at "illuminated" objects and after reflection received, whereby information on these "illuminated" objects can be obtained. Since the component of the ambient light here also is significantly greater than the data signal light component, the sensors are e.g. screened and shaded in such a manner that as little ambient light as possible reaches the optical receiver. A different path is taken by optical sensors that have an extraneous light compensation circuit. Such optical sensors or optical receivers are known, for example from the following applications:

EP 0 706 648 A1
DE 101 33 823
DE 28 49 186
DE 103 00 223 A1

The ambient light does not contain any useful information for the analysis of the data signal, in particular for detection of distant objects and/or their positions. Due to the high light intensity, a high photocurrent level is produced in the photodiode of the receiver, which would drive the receiver amplifier of this type of sensor into saturation. Therefore, the extraneous light or ambient light component of the photocurrent is suppressed before the data signal component of the photocurrent is amplified. In doing so, the fact that the ambient light is lower-frequency than the data signal is exploited. For example, the light produced by artificial lighting often has a frequency of 50 Hz or 60 Hz and harmonics thereof. The natural ambient light, or sunlight, leads to a DC component in the photocurrent.

In optical receivers the photodiode is often biased in the reverse direction, whereby in the simplest case the photocurrent is dissipated via a resistor to the power supply. This has the disadvantage however that due to this type of circuit, the photocurrent increases the power consumption of the entire circuit, since the reverse-biased photodiode works not as a source, but as a "sink" and the photocurrent component produced by the ambient light must be generated by the power supply.

In order to minimize any loading of the power supply by the photocurrent produced by the ambient light, it has proved advantageous therefore to operate the photodiode in the forward-biased direction. When connected in this manner, the power supply of the sensor at least is not under load.

EP 1 956 493 A1 describes am optical interface module with which data and energy are transmitted from a computer to an external device. The energy is supplied via actively emitted light that is transmitted via an optical fiber and then subsequently converted back into an electrical signal. By means of a signal separator, the data signal is decoupled from the energy signal. The energy, very sharply focused, strikes a special optical energy transducer, which delivers an output voltage of at least 5.5 V. However, an energy transducer of this kind with a small receiving area is a very expensive and complex element to produce, which costs several times more than conventional photodiodes. In order for sufficient energy to be transmitted, cable-bound optical energy transmission must be used. In addition, generating the optical energy signal is laborious and requires a power laser. Only in this manner can sufficient energy be transmitted so that the signal separator, in the form of a Schottky diode and a downstream storage capacitor, can be supplied. The disadvantage remains however that due to the Schottky diode, the output voltage drops by approximately 0.4 V.

In EP 0 367 333 A1, an infrared remote control unit is described which transmits data signals in the form of infrared light. At the same time the remote control unit is intended to receive energy from the ambient light in order to provide energy support for the batteries of the remote control unit. For this purpose a plurality of photodiodes are connected in series to be able to generate an output voltage which is required for charging the battery.

SUMMARY

The state of the art therefore results in the object of providing an optical receiver which is as energy-efficient as possible, with which the operating period of an optical sensor, in particular when supplied from a battery, can be significantly increased. In addition, the receiver should be cost-effective to produce.

This object is achieved by an optical receiver having the features of Claim 1, an optoelectronic measurement arrangement having the features of Claim 12 and by a method having the features of Claim 15.

The optical receiver according to the invention is used for receiving alternating-light signals and for storing electrical energy obtained from the extraneous light component of the received light. The invention therefore presupposed that the optical receiver is used in environments in which the ambient light is not screened off, but is also received by the receiver. A photodiode incorporated in the receiver receives the light, which comprises the extraneous light and an alternating-light data signal component having a higher frequency in comparison to the extraneous light, and converts the light into a photocurrent, which accordingly comprises an extraneous light current and a data signal current. The data signal current has a higher frequency than the extraneous light current, which, when it is produced by the natural ambient light, is a DC current.

In the context of the invention, the term photodiode is understood to mean any photo-element for converting visible or invisible light (electromagnetic waves) into electrical energy, preferably into a current. This can be special photodiodes for signal processing, which preferably have a receiving area of approx. 0.01 to 1 cm$^2$. Photocell modules are also included, however, which have an optical receiving area of 1 to 100 cm$^2$ and are used for example for supplying energy for low-power consumer devices.

The term extraneous light in the context of the invention covers both the natural ambient light and also the artificial (man-made) ambient light together. The term extraneous light also includes other light sources which are not used for optical data transmission or are used especially for optical energy transmission. Therefore, extraneous light includes all light components that are not to be transmitted to the photodiode in the form of a data light signal. Data signals (i.e. useful signals) in this context are both information signals transmitting data or information (and are used for detecting an object) and energy signals for supplying energy to an electrical circuit or storage unit connected to a photodiode.

In order to separate the data signal current from the extraneous light current, the invention uses the knowledge that the photodiode can be operated in forward direction, as long as the photodiode does not go into saturation. In this circuit variant the photodiode is not a load for the supply voltage. On the other hand, a corresponding forward voltage for the photodiode, which lies below the saturation voltage, has to be adjusted. From DE 44 31 117 C2 a type of operating point adjustment is known in which a variable load is connected in parallel with the photodiode.

Preferably, exactly one photodiode is used for receiving. Two or more photodiodes can also be used, which are preferably connected in series. Preferably a maximum of five photodiodes are used.

In the context of the invention it has been recognized that by means of a suitable wiring (biasing) of the photodiode in forward direction, the photocurrent produced by the ambient light can also be used in order to the increase the efficiency of the overall arrangement, in particular of the optical receiver. For this purpose the optical receiver comprises a coupling unit in which the data signal current, which is based on the optical alternating-light data signal component of the light, is decoupled and separated from the extraneous light current, which is based on the extraneous light received. The data signal current is amplified in an amplifying unit so that it is then available to an analysis unit for analysis and further processing. The amplifying unit preferably comprises a high-pass filter or a band-pass filter, so that low-frequency signals are filtered out and not amplified.

The function of the coupling unit is to separate the low-frequency photocurrent component from the higher-frequency data signal current. This can be performed by means of an inductive transformer. The primary side of the coil in this arrangement transmits the low-frequency current component, while the high-frequency component is transmitted to the secondary side. Since, depending on the working frequency, large inductances are required for the signal separation and in addition, coils can only be poorly implemented in integrated circuits (IC), it is advantageous to replace the coil by a gyrator.

A gyrator is a transformation circuit with which any desired impedance can be converted into its own impedance, which has a dual nature. For example, by using a capacitor a two-port device can be implemented that behaves externally as an inductor. For example, the energy storage regulator for controlling the energy storage unit can comprise a gyrator. The term gyrator is understood as a circuit arrangement which is formed for example from a so-called transconductance amplifier, that is, from an operational amplifier which works as a voltage-controlled current source.

The receiver according to the invention comprises an energy storage unit with a circuit for increasing the voltage. Energy can preferably be intermediately stored in this circuit, at least temporarily. The voltage applied at the input of the energy storage unit is increased in the circuit for increasing voltage in such a manner that the voltage level is uplifted and the output voltage is increased relative to the input voltage. The energy storage in the energy storage unit can be intermediately stored for this purpose in the electrical field of a capacitor. In this case the voltage increasing circuit is designated as a "charge pump". Alternatively, the energy storage can be performed in the energy storage unit and can also be performed in the electromagnetic field of an inductance or coil. Examples of this are a voltage converter or an "up-converter". In this case the circuit for increasing voltage comprises at least one inductor and one switch. In addition to the inductor it can also have two switches or a combination of a switch and a diode. Of course, a plurality of inductors and/or switches can also be used.

The energy storage unit preferably comprises at least two capacitors and at least one switch, wherein the capacitors are wired in such a manner that they can be connected in a series configuration and/or a parallel configuration. It is preferably possible to switch from the series circuit into the parallel circuit and vice versa. When charging, the energy storage unit is connected in parallel and to discharge, for example to transfer its charge to an energy accumulator, it is connected in series. By means of this circuit arrangement, when using a plurality of capacitors the voltage can also be increased to a higher voltage, that is, to multiple times that of the photodiode output voltage. An energy storage unit constructed in this manner is therefore also designated as a charge pump. It is normally controlled by means of an energy storage controller.

The energy storage controller controls and switches the switches of the energy storage unit. It can comprise a timing element and/or an oscillator which is fed by a reference voltage source. The energy storage controller can be controlled on the basis of voltage thresholds that are implemented by means of comparators and reference voltage sources. A reference voltage source in the context of the invention is understood as a circuit which from an unstabilized supply voltage, for example from the voltage at the energy accumulator (or its capacitor), generates a precise voltage with a defined value. The reference voltage source however is not an energy source that supplies energy. A simple method consists of passing the supply voltage (or the voltage provided by the energy storage unit) across a series resistor to a Z-diode. The reverse-bias voltage at the Z-diode can then be used as a reference voltage.

The re-storage of the charge stored in the energy storage unit is preferably performed to an energy accumulator, which provides a higher charge level. The energy accumulator can be, for example, a suitably selected capacitance or a capacitor. It can also comprise a rechargeable battery (with charge controller) or a similar electrical storage unit, which is charged.

If the voltage in the energy accumulator, for example in a rechargeable battery, is raised to a higher voltage level, it can form a voltage source that supplies the units and components being part of the optical receiver with voltage. With a voltage level of at least 2 Volt or 2.5 Volt, an optoelectronic measurement arrangement can also be supplied. It is thereby possible to a large extent to operate the optical receiver, or the measurement arrangement respectively, in a stand-alone mode, in any case in such a manner that at least for part of the time it can work and function without an additional power supply.

The optical receiver according to the invention allows a significantly longer operating time (with a battery or with a rechargeable battery) than other optical receivers of the prior art. This is advantageous in particular when the receiver is deployed in vehicles, e.g. as part of an alarm system in powered vehicles or in leisure boats, where no mains supply is available.

The optical receiver can furthermore be additionally supplied by other voltage sources, for example by a battery or, if present, by a mains voltage which is appropriately transformed. The energy charged in the energy storage unit can also however be used for other components of a circuit, in particular for a measurement arrangement or a measurement system in which the optical receiver is integrated. The energy storage unit can for example take on the function of a voltage buffering unit.

In a simple embodiment of the energy storage unit it can provide a voltage of 0.5 Volt, since the energy storage unit is charged up by the preferably forward-biased photodiode. Its output voltage is approximately 0.5 Volt, since this is the preferred operating point of a photodiode.

In a preferred embodiment, the energy storage unit comprises a voltage converter. The voltage converter can be a DC-DC converter. A DC-DC converter can be formed for example by a combination of an inductance and a capacitance, and by other components. The voltage converter can include at least one inductance and one, preferably two switches, wherein the second switch can be a diode.

According to the invention, the optoelectronic measurement arrangement also comprises, in addition to an optical receiver with a photodiode, amplifying unit, coupling unit and energy storage unit, a data signal light source and a compensation light source and an extraneous light compensation circuit. The energy storage unit of the optical receiver comprises at least one storage element and is charged by the extraneous light current. The storage element is preferably a capacitor. Alternatively, instead of the capacitor the measurement arrangement can have an inductor as the storage element. The optical receiver is connected into the circuit such that the energy stored in the energy storage unit by charging is used for supplying the energy for the optical receiver, at least a part of its energy supply.

The energy storage unit preferably has a circuit for increasing voltage in which energy can be temporarily stored, that is for at least a short period of time, e.g. stored for a period of more than one second. Preferably the energy obtained from the extraneous light or extraneous light component is stored in at least one capacitor of the energy storage unit. The energy storage unit can preferably comprise a plurality of capacitors which are preferably connected in series and/or in parallel, wherein it can preferably be switched between the series and parallel connections or can be switched back and forth between the two. The energy storage unit of the measurement arrangement can alternatively comprise a voltage converter with a coil and at least one switch.

The extraneous light compensation circuit includes a clock generator, a demodulator for clock-synchronous analysis of the data signal current, a modulator for generating a data signal control current for the data signal light source, a modulator for generating a compensation signal control current for the compensation light source and a regulator unit for generating at least one control signal for at least one of the modulators. If a voltage of approximately 2.5 Volt is provided by the energy storage unit or by an optional energy collection accumulator, then this voltage source can provide the operating voltage for the photoreceiver and the data signal light source and compensation light source, implemented for example as LEDs, of the optoelectronic measurement arrangement. In addition this voltage source can also be used for the modulators of the extraneous light compensation circuit.

According to the invention the (above described) optoelectronic measurement arrangement is designed in such a manner that the data signal light source and the compensation light source emit light in a specific phase relation, time-sequentially clocked. Using the regulator unit to control the compensation signal control current, the compensation light source is controllable in its light intensity in amplitude and phase in such a manner that the clock-synchronous alternating-light data signal component occurring between different phases (the alternating-light data signal component originating from the data signal light source and the compensation signal light source) is set to zero. An extraneous light compensation circuit of this kind is described in detail for example in DE 103 00 223 B3 and EP 0 706 648 B1. The content of these is incorporated into the content of this application by reference.

The optoelectronic measurement arrangement according to the invention is characterized in that the data signal current is separated from the extraneous light current in the coupling unit in such a manner that the extraneous light current is available for charging an energy storage unit. The energy storage unit in this case comprises at least one capacitor. The energy charged up in the energy storage unit is at least partly used for supplying energy to the optoelectronic measurement arrangement.

BRIEF DESCRIPTION OF THE DRAWINGS

The invention is hereafter explained in further detail using particular embodiments shown in the Figures. The special features shown there can be used separately or in combination, in order to create preferred configurations of the invention. The embodiments described do not represent any restriction of the invention which is defined in its generality by the Claims. In the Figures:

DETAILED DESCRIPTION

Figure 1:
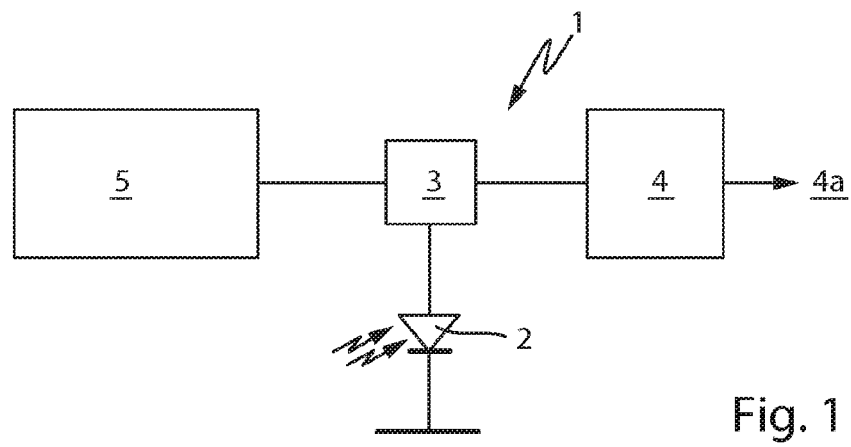
FIG. 1 shows a schematic circuit diagram of an optical receiver.

FIG. 1 shows a schematic diagram of an optical amplifier 1 having a photodiode 2 for receiving light and for converting said light into a photocurrent, a coupling unit 3, in which a data signal current of the photocurrent is separated from an extraneous light current of the photocurrent, an amplifying unit 4, in which the data signal current is amplified or converted into a voltage with a Voltage-Current-Converter (V/I-converter, i.e. a transimpedance amplifier) in order to be provided to a measurement and analysis unit for further processing, and having an energy storage unit 5. The extraneous light current of the photocurrent is stored in the energy storage unit 5 so that the energy storage unit 5 is charged. The light which is not used for energy transmission or for data transmission, and which appears in the environment of the optical receiver as ambient light or extraneous light, is used for supplying the energy storage unit 5 and enables at least a partial energy supply to the receiver (amplifier) 1. In contrast to the known optical amplifiers and measurement arrangements, the extraneous light (ambient light) does not need to be screened off, but rather is used for the supply.

Figure 2:
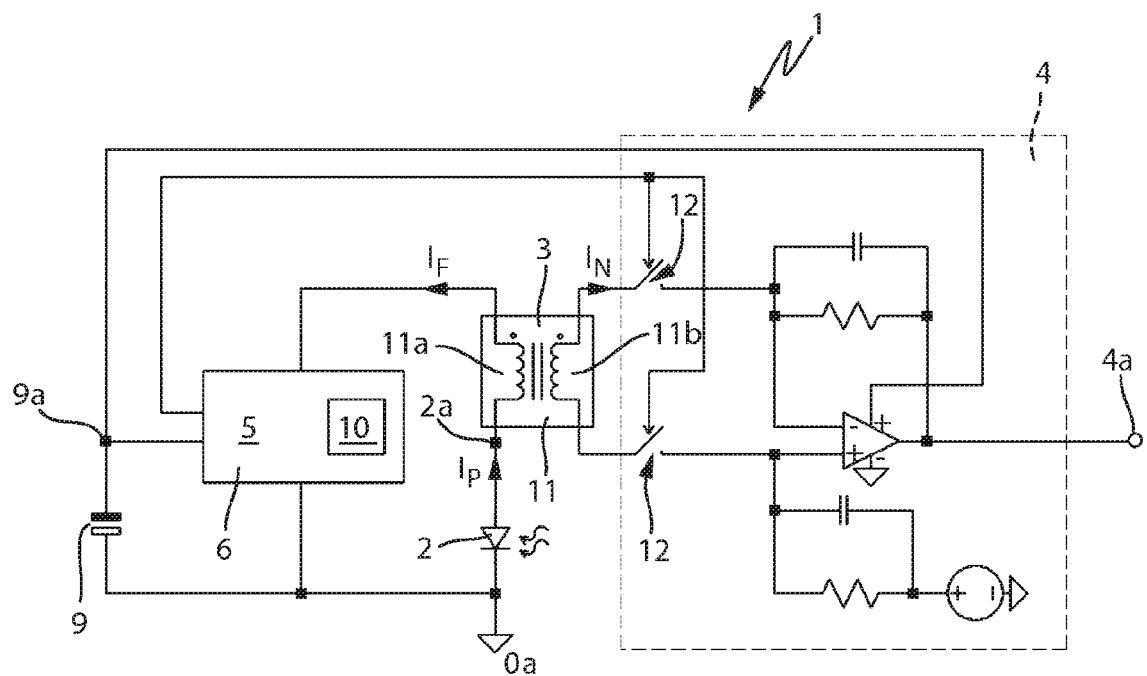
FIG. 2 shows a detailed circuit diagram of an embodiment of the optical receiver according to FIG. 1 with an energy storage unit.

FIG. 2 shows a particular embodiment of the optical receiver 1 of FIG. 1. The energy storage unit 5 is implemented in the form of a so-called charge pump 6 and comprises at least one capacitor. As a charge pump 6 the energy storage unit 5 has a plurality of capacitors and switches which can be connected in series and/or in parallel. The forward-biased photodiode 2 charges up the energy storage unit 5, wherein the voltage across the at least one capacitor of the energy storage unit corresponds to the output voltage of the photodiode.

The optical receiver 1 allows to process light which comprises a data signal component and an extraneous light component, or ambient light component. The extraneous light component is used for at least partially supplying energy to the receiver 1. Light comprising an alternating-light data signal component and extraneous light is received by the photodiode 2 and converted into a photocurrent $I_P$. The photocurrent $I_P$ comprises a data signal current $I_N$ and an extraneous light current $I_F$. The extraneous light current $I_F$ is typically low-frequency or a DC current. The photocurrent $I_P$ flows from the photodiode through the coupling unit 3, in which the data signal current $I_N$ is separated from the extraneous light current $I_F$. The extraneous light current $I_F$ flows to the energy storage unit 5 and charges it up. The data signal current $I_N$ is transmitted by the coupling unit 3 and flows into the amplifying unit 4, in which it is amplified. The data signal current $I_N$ is available for further processing at the output 4a of the amplifying unit 4.

Figure 3:
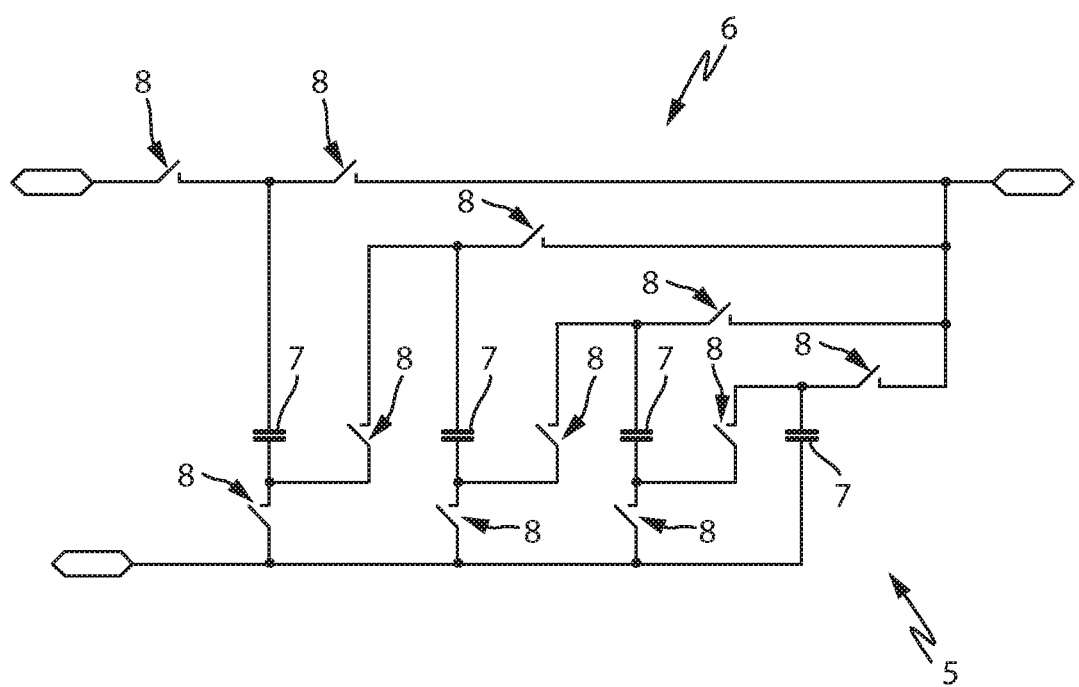
FIG. 3 shows a detailed circuit diagram of the energy storage unit of FIG. 2.

The energy storage unit 5 is preferably implemented as a charge pump 6 and comprises a plurality of (at least two) capacitors 7 and a plurality of (at least two) switches 8. FIG. 3 shows an embodiment of the energy storage unit 5, in which four capacitors 7 are present. The capacitors 7 can be connected in parallel, so that across the capacitors 7 the photodiode output voltage of the photodiode 2 of approximately 0.5 Volt is applied. Connecting the capacitors 7 in series the voltage in an energy collection accumulator 9 can be increased to multiple times of that of the photodiode output voltage. In the present example with four capacitors 7, the voltage is quadrupled, with the result that a voltage of approximately 2 Volt is present in the energy collection accumulator 9. This is achieved by a periodically repeated process. It is therefore possible to charge the energy storage unit 5 and to operate the receiver 1 in stand-alone mode with exactly one photodiode 2, without needing to provide an additional energy source. Also, two or more photodiodes 2 can be used, which are preferably connected in series. Preferably, the number of photodiodes is limited to a maximum of five, since the signal-to-noise-ratio deteriorates when a plurality of photodiodes is used.

The switches 8 used in the energy storage unit 5 are preferably implemented such that the switches already work, i.e. they are switchable, at a voltage of 0.4 Volt, preferably at a voltage of 0.3 Volt. Particularly preferably, the switches 8 can be switched even at a voltage of 0.2 Volt. This applies in particular when the switches 8 are integrated switches 8, i.e. implemented as integrated circuits or integrated circuit components. The threshold voltage of the integrated switches 8 must therefore be below 0.4 Volt, preferably below 0.3 Volt and particularly preferably around 0.25 Volt. The switches 8 are capable of functioning at or above the threshold voltage. This means that the optical receiver 1 can also be started up externally without an auxiliary voltage.

If the energy storage unit 5 is realized in CMOS technology, the definitive parameter is the threshold voltage of the NMOS and PMOS transistors, which for this purpose should not be greater than 0.25 Volt. In that case the optical sensor 1 can also be operated without an external auxiliary voltage, for example from a battery or from the mains supply. If an external power supply is available, electronic switches 8 and control elements that have a higher threshold voltage can also be used.

An energy storage controller 10 is provided to control the energy storage unit 5. The energy storage controller 10 can comprise a timing element, for example a timer or oscillator, in order to effect a clocked predetermined switching of the switches 8 present in the energy storage unit 5. The energy storage controller 10 is preferably integrated in the energy storage unit 5. The control process can also involve monitoring of the voltage across the capacitors of the intermediate energy storage, wherein comparators and reference voltage sources are applied. Both methods (timing element-based control and voltage level-based control) can also be combined together.

The coupling unit 3 of the optical receiver 1 according to FIG. 2 is a transformer 11, that is, a transformer for the signal transmission of analog and/or digital signals. The output coupling or the separating of the data signal component of the extraneous light component contained in the photocurrent can be effected not only by means of a transformer 11 but in general, also with a gyrator which the coupling unit 3 comprises.

When a transformer 11 is used, the capacitor or capacitors of the energy storage unit 5 or of the charge pump 6 are charged via the primary side 11a of the coil of the transformer 11. The primary side of the coil of the transformer 11 has a low resistance to DC current signals. Therefore, the extraneous light current component originating from the extraneous light can flow to the energy storage unit 5 unimpeded. With respect to the higher-frequency data signal component of the photocurrent however, which is typically around a few kilohertz, preferably around a few megahertz, the coil of the transformer 11 has a high resistance. So, at the output of the transformer 11 (output of a transmitter), an AC signal occurs which is fed into the amplifying unit 4 present in the secondary side 11b of the transformer, where it is amplified.

In the embodiment according to FIG. 2, the amplifying unit 4 comprises switches 12, which isolate the photodiode 2 from the amplifying unit 4 at least some of the time. The photodiode 2 and the amplifying unit 4 are preferably fully isolated when the transfer of the stored energy takes place from the energy storage unit 5 to the energy collection accumulator 9.

Such an embodiment of the amplifying unit 4 is advantageous, because the analysis of the data signal current $I_N$ at the amplifying unit 4 has to be interrupted when the charge transfer is taking place. Otherwise the data signal would be superimposed with the switching pulse and the measurement, for example for the detection of an object, would be corrupted. By opening the switches 12 on the secondary side 11b of the coils of the transformer 11, the amplifying unit 4, implemented for example as a transimpedance amplifier is disconnected.

Figure 4:
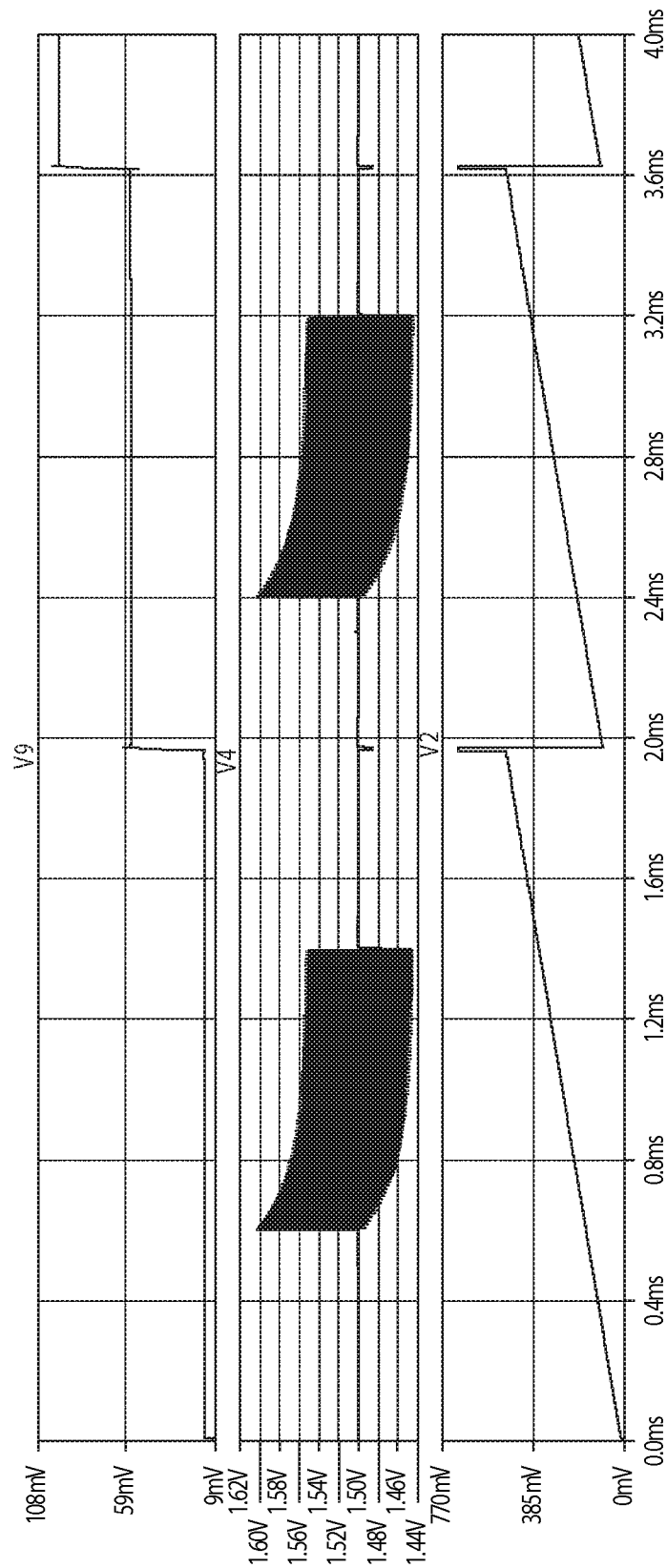
FIG. 4 shows a signal waveform of the data signal provided at an amplifying unit of the optical receiver, of the temporal voltage waveform of the energy storage unit during charging and of the voltage waveform of an energy collection accumulator.
Figure 5:
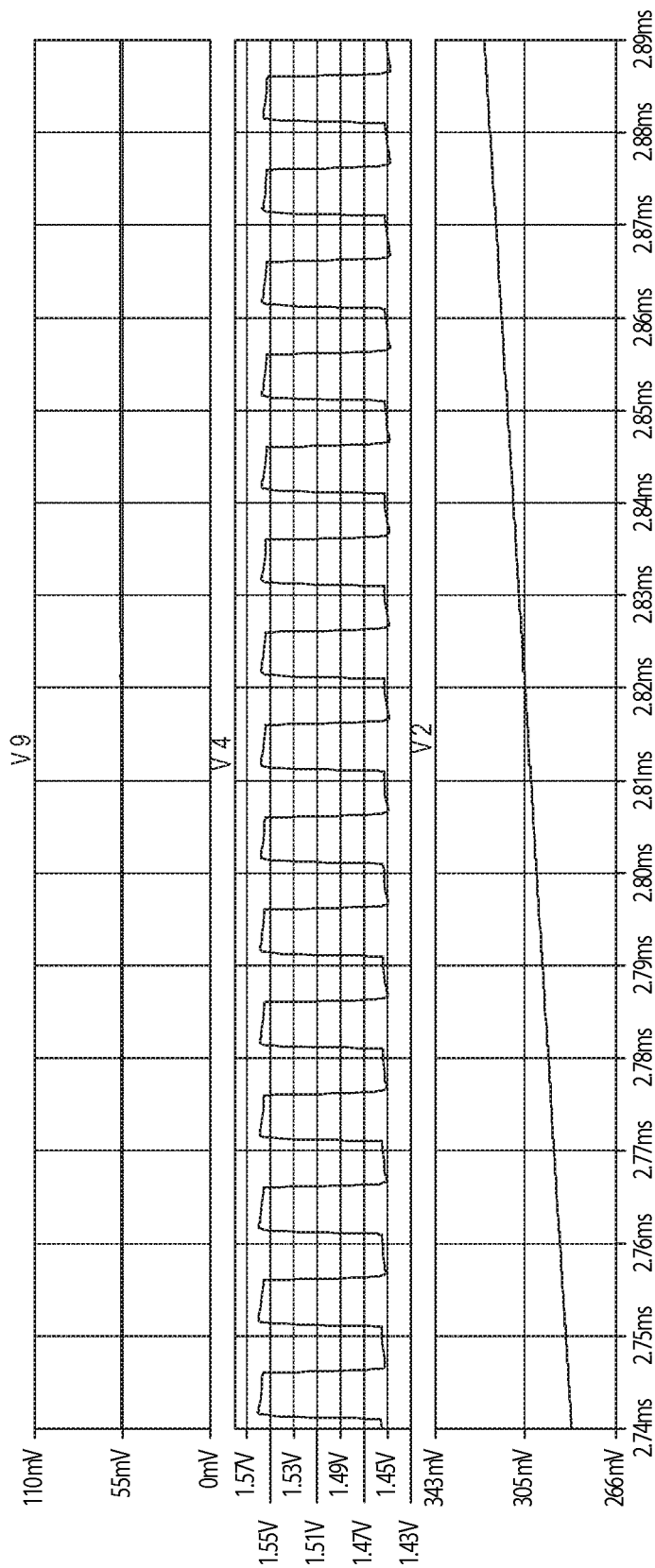
FIG. 5 shows an enlarged excerpt of the signal waveforms of FIG. 4.

The temporal waveforms of the signal voltage in FIGS. 4 and 5 show the interaction between obtaining energy and the measurement process. FIG. 5 shows a detail of FIG. 4 in the time interval of 2.74 ms to 2.89 ms. While the capacitors 7 of the energy storage unit 5 are being charged, the voltage V2 between the node 2a and 0a in FIG. 2 increases linearly. The voltage waveform V2 is shown in the lower diagram of FIGS. 4 and 5. While the capacitors 7 are being charged, a measurement can be performed. The data signal current $I_N$ is coupled out via the transformer 11 and appears at the output 4a of the amplifying unit 4. The measurement of the data signal current $I_N$ is interrupted during the discharge of the energy storage unit 5 and during the transfer of the charge to the energy collection accumulator 9. As soon as the voltage V2 of the photodiode 2 between the nodes 2a and 0a has risen to approximately 0.5 Volt, a charge transfer to the energy collection accumulator 9 occurs. In the upper diagram the waveform of the voltage V9 across the energy collection accumulator 9 (between the nodes 9a and 0a) can be seen. The capacitors 7 of the energy storage unit 5 are discharged and the charging process starts again as soon as the switches 8 of the energy storage unit 5 are again connected such that the capacitors 7 are in parallel with the series circuit formed by the coupling unit 3 and the photodiode 2.

Figure 6:
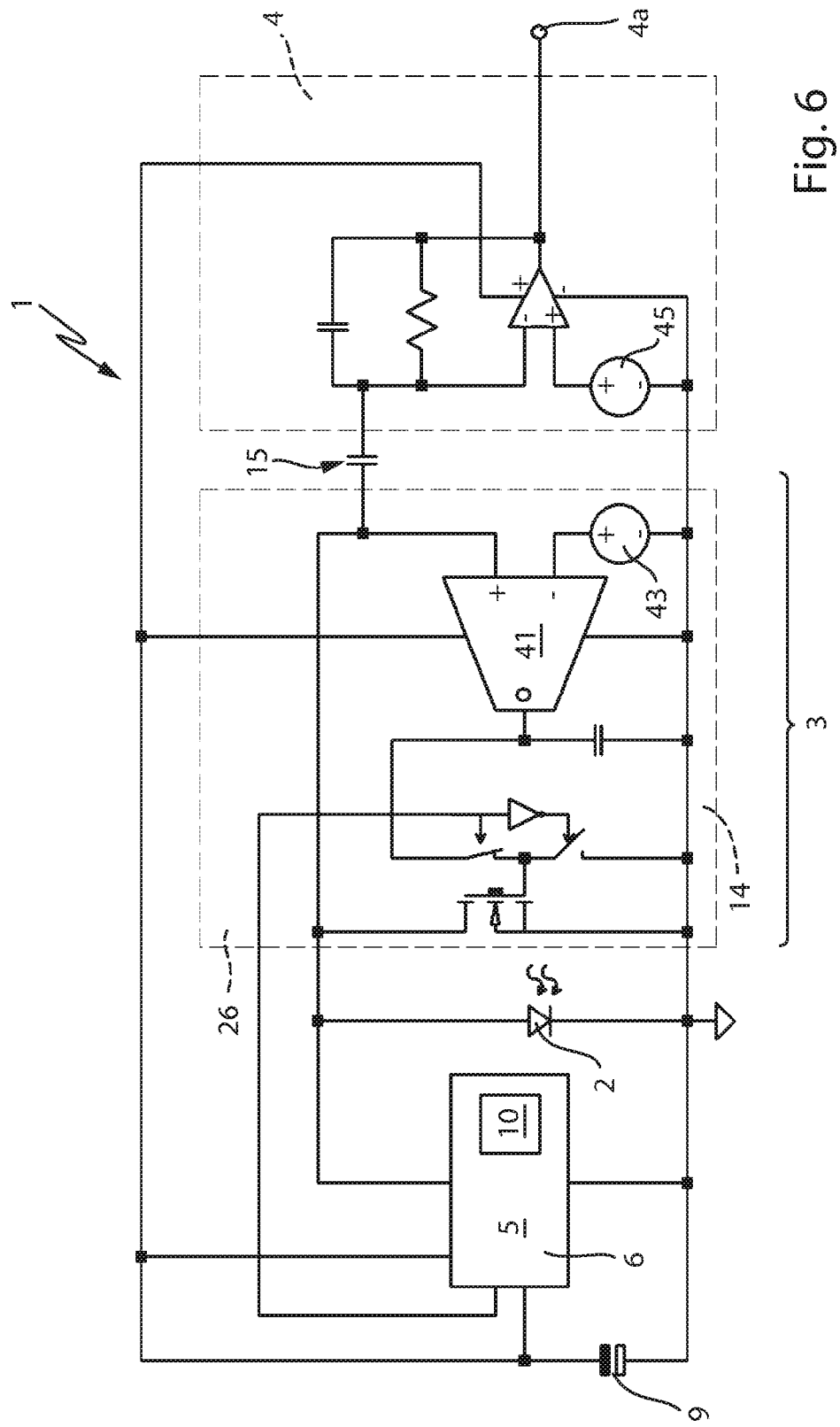
FIG. 6 shows a circuit diagram of an alternative embodiment of an optical receiver.

FIG. 6 indicates a circuit variant of an optical receiver 1 in which the coupling unit 3 is implemented by means of a gyrator circuit 14 with a gyrator 41. The coupling unit 3 also comprises, in addition to the gyrator circuit 14, an output capacitor 15, with which the capacitors 7 of the energy storage unit 5 (and the photodiode 2) are connected in parallel during the charging process. In order that the efficiency of the energy extraction is as high as possible, the output capacitor 15 for the data signal current $I_N$ must be small in comparison to the capacitors 7 of the energy storage unit 5. This means, however, that the data signal current $I_N$ is reduced, that is, the data signal is attenuated, because the voltage is divided across the capacitors according to the ratio of the capacitor values.

Therefore, wiring the circuit shown in FIG. 6, the data signal can only be read out when the capacitors 7 of the energy storage unit 5 are decoupled from the photodiode 2. For this case, the gyrator circuit 14, which includes a transconductance amplifier 41 and an NMOS transistor, assumes the function of operating point stabilization of the photodiode. The gyrator circuit 14 thus works as a photodiode voltage limiter and is therefore implemented as a photodiode voltage limiter circuit 26. It is thereby ensured that the forward voltage of the diode is limited to approximately 0.5 Volt and is stabilized. In order to save current, the pauses between the measurements, i.e. the sampling of the data signal, are typically at least ten times larger than the actual measurement period. For this reason this restriction to a sequential operation is not serious. However, due to this, the efficiency of the receiver circuit falls by up to 20%.

The embodiments of the optical receiver 1 shown in the Figures are particularly suited to the storage and ultimately the supply of power to the optical receiver 1. The energy from the ambient light received with the photodiode 2 can be stored and "fed back" to an energy collection accumulator 9, which is implemented for example as a rechargeable battery. With sufficient illumination of the photodiode 2 therefore, a stand-alone operation of the optical receiver 1 is also possible. The invention has the advantage that, with only one photodiode, a stand-alone operation is possible without a voltage source, e.g. a battery or rechargeable battery. Of course, two or more photodiodes can be connected in series in order to obtain a higher starting voltage for the energy storage unit. However, this increases the size of the receiver unit, as well as its cost. The optical receiver 1 with a photodiode 2 is therefore particularly well suited for use in applications in which the receiver or optical sensor, into which the optical receiver 1 is integrated, have no access to the mains supply and the current consumption must therefore be particularly small. It is conceivable for example, that such a sensor is supported at night with a rechargeable battery or with a "Supercap-capacitor". By recharging during the day, when the ambient light level is high enough, the energy buffer can be recharged again. This means that the maintenance intervals of such a sensor are significantly increased.

Advantageously the production costs of the optical receiver 1 are hardly increased at all, because the photodiode needed for the energy storage is already present in the optical receiver for receiving the data signal. In optical measurement arrangements in particular, which can also be used in strong ambient light and work without errors, an optical receiver of this kind is very advantageous. It is precisely this property (strong ambient light) which is important so that the energy extraction in the optical receiver 1 can be used in a meaningful manner.

Furthermore, it is conceivable to enlarge the effective area of the photodiode, for example by means of lenses. In this manner the photocurrent can be maximized without the costs of such an optical receiver or optical sensor noticeably increasing, because the reflectors and optical concentrators can be produced from plastic materials and therefore are much less expensive than, for example, enlarging the photodiode and its silicon area.

Figure 7:
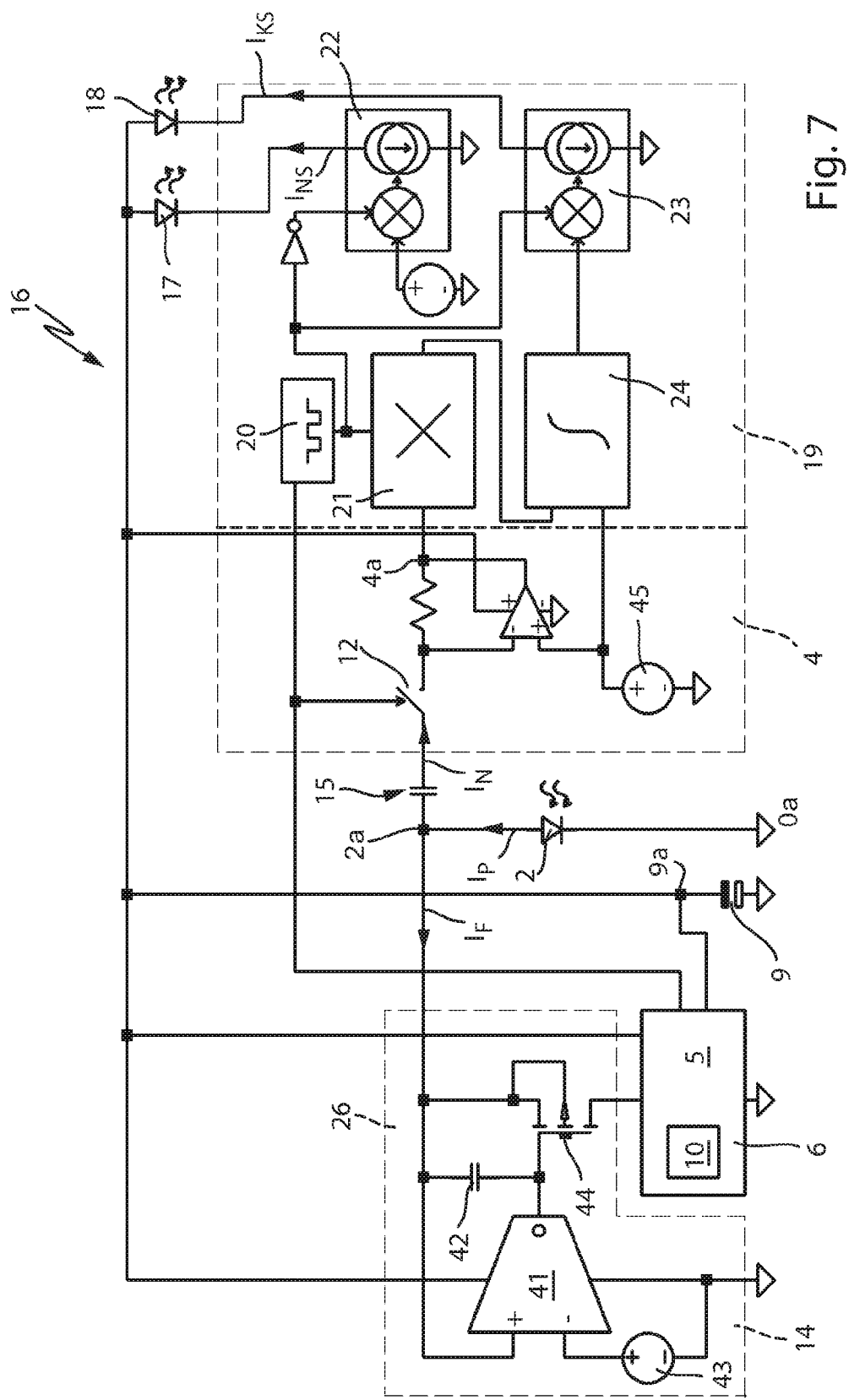
FIG. 7 shows a schematic circuit diagram of an optoelectronic measurement arrangement comprising an optical receiver.

FIG. 7 shows an embodiment of an optical receiver 1 which is integrated into an optoelectronic measurement arrangement 16. The optoelectronic measurement arrangement 16 comprises, in addition to the optical receiver 1 with one (or more) photodiodes, a data signal light source 17, a compensation light source 18 and an extraneous light compensation circuit 19. The extraneous light compensation circuit 19 includes a clock generator 20, a demodulator 21 for clock-synchronous analysis of the data signal current $I_n$, a modulator 22 for generating a data signal control current $I_{Ns}$ for the data signal light source 17, a modulator 23 for generating a compensation signal control current $I_{Ks}$ for the compensation light source 18 and a regulator unit 24 for generating at least one control signal for at least one of the modulators 22, 23.

The data signal light source 17 and/or the compensation light source 18 are preferably implemented as LEDs. Both light sources are driven in such a manner that they emit light in a specific phase relation, time-sequentially clocked. The phases of the data signal control current $I_{Ns}$ and the compensation signal control current $I_{Ks}$ are phase-shifted by 180°. The two control currents therefore have a different sign.

In the embodiment according to FIG. 7 the modulator 23 is driven by the regulator unit 24 in such a manner that the compensation signal control current $I_{Ks}$ is varied such that the light intensity and/or phase emitted by the compensation light source 18 can be regulated. The compensation light source 18 is thus regulated in such a manner that the clock-synchronous alternating-light data signal current occurring between different phases, which flows from the photodiode 2 via the coupling unit 3 into the extraneous light compensation circuit 19, becomes zero. The exact functioning of the extraneous light compensation circuit is described in DE 103 00 223 B3.

The optoelectronic measurement arrangement 16 comprises an energy storage controller 10 and a photodiode limiter circuit 26 implemented as a gyrator circuit 14. The photodiode limiter circuit 26 preferably consists of a regulated load that draws sufficient current such that the forward voltage of the diode 2 is held constant at 0.5 Volt. The gyrator circuit 14 comprises a transconductance amplifier 41, a filter capacitor 42, a reference source 43 and a field-effect transistor 44. It therefore has a low-pass characteristic. It is hereby ensured that the extraneous light current $I_F$ originating from the temporally constant ambient light is fed to the energy storage unit 5, but not the high-frequency current component (data signal current $I_N$) which was emitted via the data signal light source 17 and the compensation light source 18 in the form of an alternating data signal. The data signal current of the photocurrent $I_P$ is coupled out via the output capacitor 15 and fed to the amplifying unit 4 and the extraneous light compensation circuit 19.

To couple out the data signal (information output coupling) it is necessary that the photodiode 2 be operated with an internal resistance which is as high as possible. The photodiode 2 must therefore not be completely forward biased, since in this case the internal resistance would be very low and the data signal current can no longer be capacitively coupled out. The gyrator circuit 14 therefore serves as a photodiode voltage limiter and sets the operating point of the photodiode 2 to a forward voltage from 0.2 Volt to 0.6 Volt, preferably to 0.5 Volt. The internal resistance is thereby high enough for coupling out data signal current. The high internal resistance enables the high sensitivity necessary for the sensor function of the photodiode 2. At the same time the photodiode 2 acts, as desired, as a source for the energy supply.

In the optoelectronic measurement arrangement 16 the (low-frequency) extraneous light current $I_F$ is coupled out via the gyrator circuit 14 in such a manner that it is fed to the energy storage unit 5 and the at least one capacitor 8 of the energy storage unit 5 and is temporarily stored there. The energy storage unit 5, preferably implemented as a charge pump 6, can magnify the voltage level of the preferably one photodiode 2. For example, the voltage can be raised to 2.5 Volt. For example, the charge pump can be formed by at least two capacitors and at least two switches. This means it is possible to provide the operating voltage for the optoelectronic measurement arrangement, including the data signal light source 17 and the compensation light source 18. The light sources implemented as LEDs require, for example, an operating voltage of approximately 2 Volt, since the diode forward voltage of the LEDs typically lies between 1.2 and 1.8 Volt. If e.g. two photodiodes are connected in series, the charge pump 6 can be adapted accordingly. Alternatively, the charge pump can be replaced by an up-converter. The up-converter has at least one coil and one switch, preferably two switches, wherein one of the switches can be a diode. The voltage converter can be, for example, a DC-DC converter.

Figure 8:
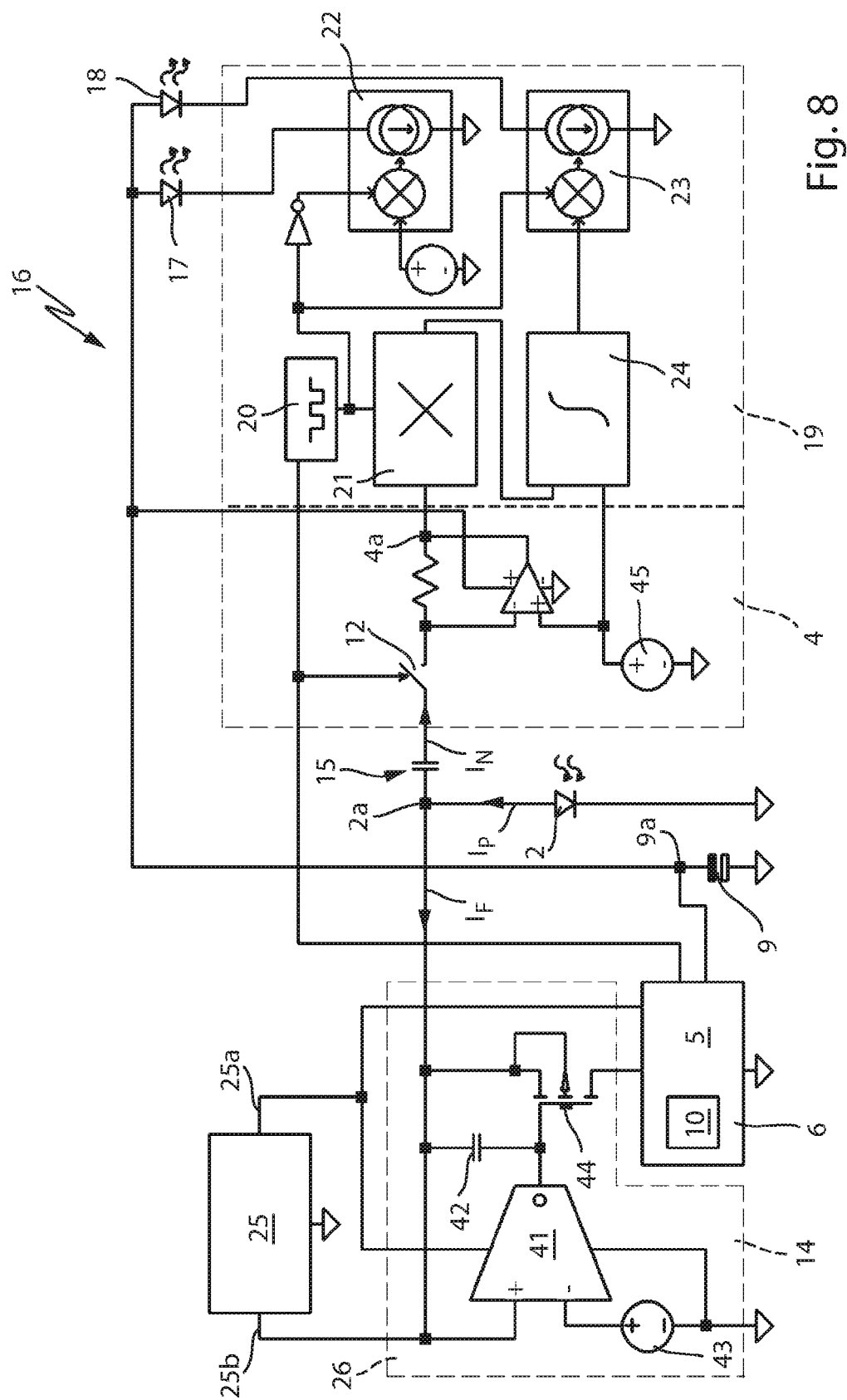
FIG. 8 shows a schematic circuit diagram of an alternative embodiment of an optoelectronic measurement arrangement.

Depending on the technology used for realizing the optoelectronic measurement arrangement 16 or an optical sensor (IC technology), it is sometimes difficult or impossible to operate the energy storage unit 5 and the gyrator circuit 14 (photodiode limiter circuit 26) without an external voltage source or auxiliary voltage source, and to only start with the voltage of approximately 0.5 to 0.7 Volt provided by the photodiode 2. If it is intended to dispense with an additional voltage source (external voltage source, auxiliary voltage source such as a battery or rechargeable battery), an embodiment as shown in FIG. 8 can be used. Compared to the embodiment according to FIG. 7 the optoelectronic measurement arrangement 16 according to FIG. 8 has an additional starting circuit 25, which for example can be assembled similarly to the charge pump 6 from a plurality of capacitors. In the circuit arrangement according to FIG. 8 the coupling unit 3 is formed from the gyrator circuit 14 and the output capacitor 15. The input capacitance $C_{IN}$ of the energy storage unit 5 is connected via the field-effect transistor 44 to the output capacitor 15. At the same time the input capacitance $C_{IN}$ and the output capacitor 15 are isolated by the field-effect transistor 44. In this case the gyrator 41 (transconductance amplifier) is implemented in PMOS transistor technology. Using this circuit arrangement it is possible to operate the energy storage unit 5 at the same time to measure the data signal current $I_N$, i.e. to store energy at the same time (the capacitors of the energy storage unit 5 are charged) and to carry out an information transfer. For this reason this circuit arrangement is particularly efficient.

The starting circuit 25 is typically implemented such that it works even at particularly low operating voltages. It can be used to transform the photodiode voltage from approx. 0.5 Volt to a higher voltage level, so that the gyrator (gyrator circuit 14) together with the energy storage unit 5 can be supplied with a sufficiently high operating voltage. The starting circuit 25 has a lower energy efficiency than the charge pump 6 or the energy storage unit 5.

The optoelectronic measurement arrangement 16 can in this case be operated without a separate voltage source. The measurement arrangement 16 therefore operates as a stand-alone device and can be used in particular in mobile devices or vehicles. Since no additional batteries or other voltage supplies have to be used, the maintenance requirements of such a storage arrangement is are therefore reduced. An important point here is that the reference voltage sources 43, 45 indicated in FIG. 8 can be replaced. These voltage sources are provided by the energy storage unit 5 or the energy collection accumulator 9 respectively. They are thus to be viewed in the Figures only as a schematic explanation of the functioning and hence are not implemented in the circuit arrangement.

In order for the optical receiver 1 and the optoelectronic measurement arrangement 16 to be able to work in stand-alone mode, the voltage provided by the photodiode 2 must be increased accordingly, so that for example the gyrator circuit 14 or a similar voltage converter circuit can be supplied with a sufficiently high voltage level. A starting circuit 25 used for this purpose must be designed accordingly.

Figure 9:
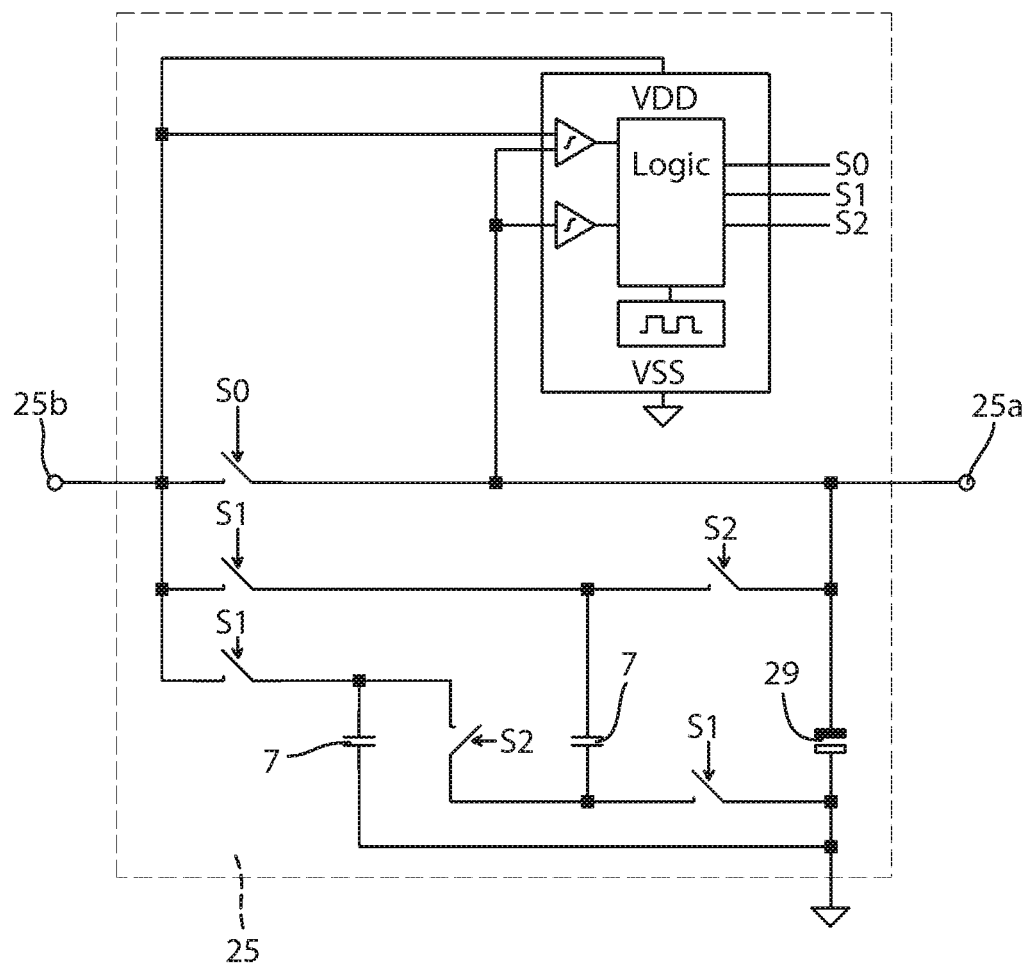
FIG. 9 shows a schematic circuit diagram of a startup circuit of an optoelectronic measurement arrangement.

FIG. 9 shows a schematic drawing of a first embodiment of a starting circuit 25, as used in the circuit arrangement in FIG. 8. At the beginning of the charging process the switches S0 and S1 are first closed, in order to charge up an optional temporary storage unit 29 or the energy collection accumulator 9 and the two capacitors 7 of the energy storage unit 5 up to the photodiode voltage, which is typically between 0.5 Volt and 0.7 Volt. As soon as the capacitors 7 of the energy storage unit 5 or the energy collection accumulator 9 or the temporary storage unit 29 are appropriately charged, the switches S0 and S1 are opened. By now closing a switch S2, the charge of the two capacitors 7 is transferred to the energy collection accumulator 9. By subsequent alternating switching of the switches S1 and S2 while the switch S0 is open, an incremental increase in the voltage of the energy collection accumulator 9 is made. This process can last until, for example, the voltage in the energy collection accumulator 9 is equal to at least twice the photodiode voltage of the photodiode 2. The switches S0, S1 and/or S2 can be realized in CMOS technology.

Figure 10B:
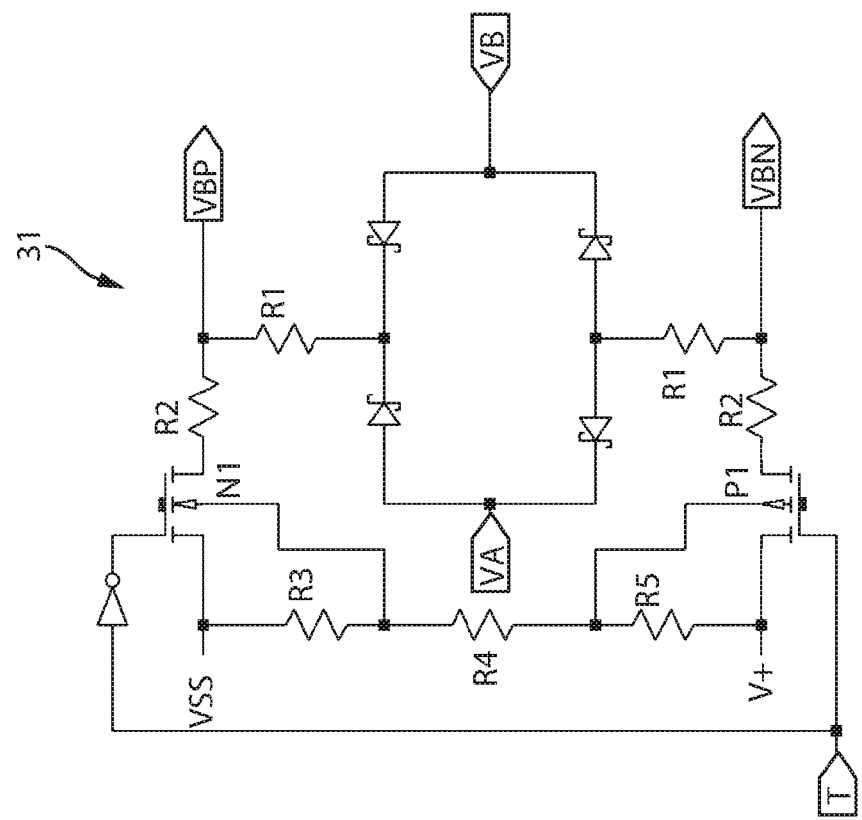
FIG. 10a-c show detailed circuit diagrams of the startup circuit according to FIG. 9.
Figure 10A:
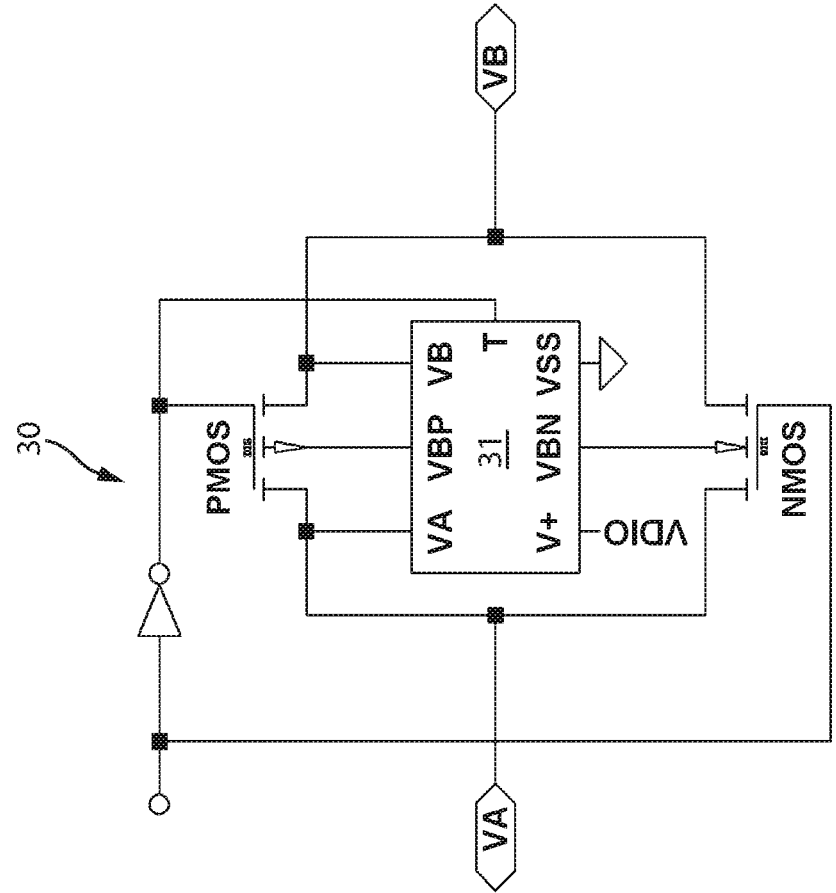
Figure 10C:
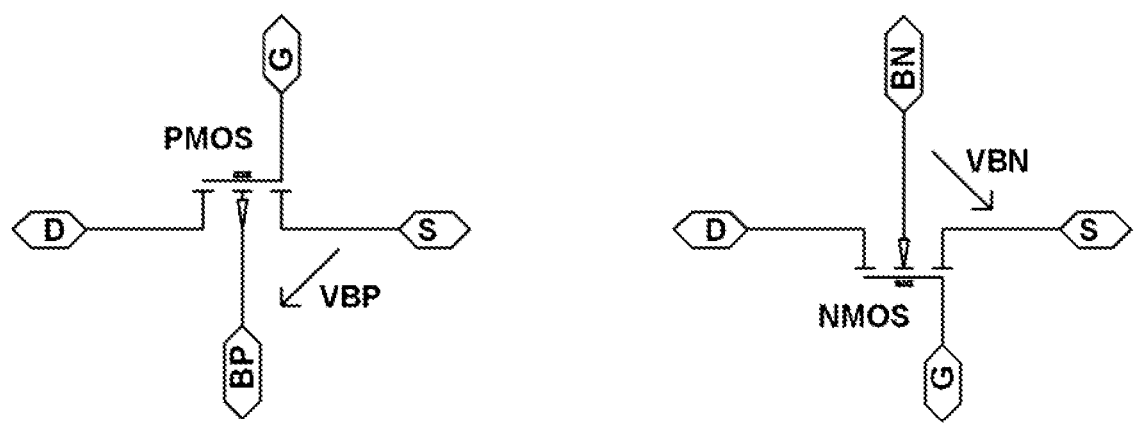

FIG. 10a shows an embodiment of a circuit arrangement 30 of the switches S0, S1 and S2 for controlling the starting circuit 25 according to FIG. 9. The circuit arrangement 30 has an input 30a, an output 30b and a switch input 30c, at which the corresponding switching signals are applied. With this circuit the starting resistance of the switches S0, S1, S2, implemented as CMOS analog switches, is reduced. This arrangement solves the problem that CMOS transistors as switches typically only guarantee a reliable switching function at a switching voltage that is higher than their threshold voltage. In the case of the low photodiode voltage, reliable switching is only guaranteed when the starting resistance of the switch can be reduced. In general the switching process of a CMOS analog switch takes place via the gate voltages of the PMOS and NMOS transistors. The substrate terminal BN, BP is at the same potential as the source terminal S or is more negative, so that the substrate diode is reverse-biased. FIG. 10c shows the direction of rotation of the substrate voltage VBP in PMOS transistors and VBN in NMOS transistors. The substrate diodes are therefore operated with a temporally constant reverse-bias voltage and consequently have a maximum voltage of 0 Volt.

When the circuit arrangement is adjusted such that the substrate voltage VBN, VBP is regulated or set to a positive value which is approx. 0.2 Volt less than the forward voltage of the substrate diodes, the threshold voltage of the transistors is reduced. The starting resistance is minimized at the given gate voltage. It is desirable to set or regulate the substrate voltage to a value equal to or less than 0 Volt, so that the transistors also are as high-impedance as possible when in the off state. The threshold voltage of the transistors is hereby increased and the transistors are securely switched off. By switching the substrate voltage VBN or VBP from a maximally negative voltage in the off state to a positive voltage that is less than the forward voltage of the substrate diodes in the on state, a reliable and precise switching of the transistors on and off is guaranteed.

It can be seen from FIG. 10a that the substrate terminals of the transistors are controlled by a unit which synchronously with a switch-on signal (applied at the switching input 30c) sets the substrate voltages VBP of the PMOS transistors and VBN of the NMOS transistor in each case to a positive value, for example approx. 0.4 Volt. In the off state the voltage is set to 0 Volt, preferably to a maximally negative value, i.e. less than 0 Volt.

A circuit arrangement 31 as shown in FIG. 10b can be used for implementing the substrate voltage controller, which is required for controlling the starting circuit 25. By using Schottky diodes the "most positive" and "most negative" voltage is extracted at the two terminals of the analog switch. A corresponding switchover is effected via the two field-effect transistors P1 and N1. The output voltage VBP hereby generated is the substrate voltage for the PMOS transistor. The voltage VBN is the substrate voltage for the NMOS transistor.

It can be advantageous also to use controlled current sources instead of the two transistors N1 and P1. It is clear to the person skilled in the art that similar embodiments and circuit arrangements also lead to the same objective. The only essential feature is that a reliable switch is produced which also works reliably at low voltages of less than 0.7 Volt, preferably of less than or equal to 0.5 Volt. So, an energy storage can be charged with the given photodiode voltage of the photodiode 2. The control of the energy storage unit 5 of the optical receiver functions reliably by using that energy storage.

The invention claimed is:

1. Optical receiver for receiving alternating-light data signals and for storing electrical energy obtained from extraneous light, comprising
    a photodiode for receiving light, which comprises the extraneous light and an alternating-light data signal component having a higher frequency in comparison to the extraneous light, and for converting the light into a photocurrent (IP), which comprises a data signal current (IN) and an extraneous light current (IF), wherein the extraneous light excludes optical data transmission light sources and optical energy transmission light sources,
    a coupling unit for decoupling and separating the data signal current (IN), which was generated by the optical alternating-light data signal component, from the extraneous light current (IF), which was generated by the extraneous light,
    an amplifying unit for amplifying the data signal current (IN) and
    an energy storage unit, which is charged by the extraneous light current (IF) and which comprises a circuit for increasing voltage,
    wherein the energy stored in the energy storage unit is used for at least partially supplying the energy for the optical receiver and/or for at least partially supplying the energy for a measurement arrangement comprising the optical receiver.

2. Optical receiver according to claim 1, characterized in that the circuit for increasing voltage in the energy storage unit includes at least two capacitors and switches, so that the capacitors can be connected in series or in parallel and switching can take place from the series circuit to the parallel circuit.

3. Optical receiver according to claim 2, characterized in that the capacitors are connected in series, in order to transfer the energy of the charged energy storage unit to an energy collection accumulator with a higher voltage level.

4. Optical receiver according to claim 3, characterized by a switch which isolates the photodiode from the amplifying unit at least temporarily in such a manner that the photodiode is isolated from the amplifying unit when a transfer of charge from the energy storage unit to an energy collection accumulator is taking place.

5. Optical receiver according to claim 2, characterized in that the switches used in the energy storage unit are implemented in such a manner that the switches can be switched starting from a voltage of 0.4 Volt, preferably from a voltage of 0.3 Volt, particularly preferably from a voltage of 0.2 Volt, in particular when the switches are integrated switches, such that their threshold voltage is below 0.4 Volt, preferably below 0.3 Volt, particularly preferably close to 0.25 Volt.

6. Optical receiver according to claim 1, characterized by an energy storage controller for controlling the energy storage unit.

7. Optical receiver according to claim 6, characterized in that the energy storage unit is decouplable from the photodiode by a gyrator.

8. Optical receiver according to claim 1, characterized in that the energy storage unit comprises a voltage converter which has at least one coil and one switch.

9. Optical receiver according to claim 1, characterized in that the coupling unit comprises a transformer or a gyrator.

10. Optical receiver according to claim 1, characterized in that the amplifying unit comprises a band-pass filter or a high-pass filter and/or the amplifying unit is designed as a current amplifier or works as a current-voltage converter.

11. Optical receiver according to claim 1, characterized in that the photodiode is biased in the forward direction.

12. Optical receiver according to claim 11, wherein a photodiode limiter circuit controls a forward voltage of the photodiode at less than 0.7 Volt.

13. Optical receiver according to claim 12, wherein the photodiode limiter circuit controls the forward voltage of the photodiode in a range between 0.2 and 0.6 Volt.

14. Optical receiver according to claim 13, wherein the photodiode limiter circuit controls the forward voltage of the photodiode at 0.5 Volt.

15. Optoelectronic measurement arrangement comprising
a data signal light source and a compensation light source, which emit light in a specific phase relation, time-sequentially clocked,
an optical receiver, in particular an optical receiver according to any one of the preceding claims, having a photodiode for receiving light comprising a clock-synchronous alternating-light data signal component emitted by the light source and an extraneous light component, and having an amplifying unit for amplifying a data signal current (IN) based on the received alternating-light data signal component,
and
an extraneous light compensation circuit, to which the data signal current (IN) is fed,
wherein
the extraneous light compensation circuit comprises
a clock generator,
a demodulator for the clock-synchronous analysis of the data signal current (IN),
a modulator for generating a data signal control current (INS) for the data signal light source,
a modulator for generating a compensation signal control current (IKS) for the compensation light source, and
a regulator unit for generating at least one control signal for at least one of the modulators,
the compensation light source can be controlled in its light intensity in amplitude and phase by means of the regulator unit by controlling the compensation signal control current in such a manner that the clock-synchronous alternating-light data signal component occurring between different phases is set to zero,
characterized by
a coupling unit for separating the data signal current (IN) from an extraneous light current (IF), which is generated by the extraneous light component contained in the light,
an energy storage unit which is charged by the extraneous light current (IF) and which includes at least one storage element for energy storage,
wherein the at least one storage element is charged by the extraneous light current (IF) and the energy charged up in the energy storage unit is at least partly used for supplying energy to the optoelectronic measurement arrangement.

16. Optoelectronic measurement arrangement according to claim 15, characterized by an energy collection accumulator which is charged up by the energy storage unit in such a manner that it has a higher voltage potential than the energy storage unit.

17. Optoelectronic measurement arrangement according to claim 15, characterized in that the data signal light source and/or the compensation light source is an LED.

18. Method for storing electrical energy obtained from extraneous light, and for receiving optical alternating-light data signals,
with an optical receiver for receiving light comprising an alternating-light data signal component and an extraneous light component, wherein the optical receiver includes a photodiode, a coupling unit, an amplifying unit and an energy storage unit,
comprising the following steps:
receiving light by means of the photodiode of the optical receiver and converting said light into an electrical photocurrent (IP), which comprises a data signal current (IN) based on the optical alternating-light data signal component and an extraneous light current (IF) based on the extraneous light component, wherein the extraneous light component excludes optical data transmission light sources and optical energy transmission light sources,
separating the electrical data signal current (IN) from the electrical extraneous light current (IF) by means of the coupling unit,
amplifying the data signal current (IN) by means of the amplifying unit and providing it to an analysis unit for further processing,
charging of the energy storage unit by means of the extraneous light current (IF), wherein the energy storage unit comprises at least one storage element which is charged up by the extraneous light current (IF),
increasing the voltage in the energy storage unit by means of a circuit for increasing voltage, and
providing and using the energy stored in the energy storage unit for at least partially supplying energy to the optical receiver.

19. Optical receiver for receiving alternating-light data signals and for storing electrical energy obtained from extraneous light, comprising
a photodiode for receiving light, which comprises the extraneous light and an alternating-light data signal component having a higher frequency in comparison to the extraneous light, and for converting the light into a photocurrent (IP), which comprises a data signal current (IN) and an extraneous light current (IF),
a coupling unit for decoupling and separating the data signal current (IN), which was generated by the optical alternating-light data signal component, from the extraneous light current (IF), which was generated by the extraneous light,
an amplifying unit for amplifying the data signal current (IN) and
an energy storage unit, which is charged by the extraneous light current (IF) and which comprises a circuit for increasing voltage,
wherein the energy stored in the energy storage unit is used for at least partially supplying the energy for the optical receiver and/or for at least partially supplying the energy for a measurement arrangement comprising the optical receiver, and
wherein the circuit for increasing voltage in the energy storage unit includes at least two capacitors and switches, so that the capacitors can be connected in series or in parallel and switching can take place from the series circuit to the parallel circuit.

20. Optical receiver according to claim 19, characterized in that the capacitors are connected in series, in order to transfer the energy of the charged energy storage unit to an energy collection accumulator with a higher voltage level.

21. Optical receiver according to claim 19, characterized by a switch which isolates the photodiode from the amplifying unit at least temporarily in such a manner that the photodiode is isolated from the amplifying unit when a transfer of charge from the energy storage unit to an energy collection accumulator is taking place.

22. Optical receiver according to claim 19, characterized in that the switches used in the energy storage unit are implemented in such a manner that the switches can be switched starting from a voltage of 0.4 Volt, preferably from a voltage of 0.3 Volt, particularly preferably from a voltage of 0.2 Volt, in particular when the switches are integrated switches, such that their threshold voltage is below 0.4 Volt, preferably below 0.3 Volt, particularly preferably close to 0.25 Volt.

* * * * *